United States Patent
Rybak et al.

(10) Patent No.: US 8,024,510 B2
(45) Date of Patent: *Sep. 20, 2011

(54) CYCLIC BUFFER MECHANISM FOR RECEIVING WIRELESS DATA UNDER VARYING DATA TRAFFIC CONDITIONS

(75) Inventors: Mike Rybak, Kitchener (CA); Jeff LeJeune, Waterloo (CA); Rodney Bylsma, Kanata (CA); Rob Oliver, Calgary (CA)

(73) Assignee: Research In Motion Limited, Waterloo (CA)

( * ) Notice: Subject to any disclaimer, the term of this patent is extended or adjusted under 35 U.S.C. 154(b) by 44 days.

This patent is subject to a terminal disclaimer.

(21) Appl. No.: 12/577,392

(22) Filed: Oct. 12, 2009

(65) Prior Publication Data

US 2010/0030950 A1  Feb. 4, 2010

Related U.S. Application Data

(63) Continuation of application No. 11/314,169, filed on Dec. 21, 2005, now Pat. No. 7,603,511.

(60) Provisional application No. 60/639,351, filed on Dec. 27, 2004.

(51) Int. Cl.
G06F 12/00 (2006.01)
G06F 13/36 (2006.01)
H04B 1/38 (2006.01)
H04B 1/04 (2006.01)

(52) U.S. Cl. ...... 711/103; 340/5.61; 340/5.64; 710/310; 711/104

(58) Field of Classification Search .......... 711/103, 711/104; 340/5.61, 5.64; 710/310
See application file for complete search history.

(56) References Cited

U.S. PATENT DOCUMENTS

| 5,581,726 A | 12/1996 | Tanaka |
| 6,092,160 A | 7/2000 | Marsters |
| 2004/0004737 A1 | 1/2004 | Kahn et al. |

FOREIGN PATENT DOCUMENTS

| CA | 2336700 A1 | 1/2001 |
| EP | 0 398 654 A | 11/1990 |
| EP | 0834882 A2 | 4/1998 |
| EP | 1065626 A1 | 1/2001 |
| JP | P2002-247015 A | 8/2002 |
| WO | 03/102783 A1 | 12/2003 |

Primary Examiner — Kevin Ellis
Assistant Examiner — Mehdi Namazi
(74) Attorney, Agent, or Firm — Ridout & Maybee LLP

(57) ABSTRACT

A method of ensuring that data sent to a handheld wireless communications device is written to non-volatile memory is disclosed. In a device, where data is initially written to a first volatile memory and then written to a second volatile memory before being written from the second volatile memory to a non-volatile memory, software code is implemented that causes the writing of the data to non-volatile memory concurrently with the writing of the data to the second volatile memory. The software code may incorporate operating system commands (such as Windows OS).

20 Claims, 5 Drawing Sheets

CYCLIC BUFFER MECHANISM FOR RECEIVING WIRELESS DATA UNDER VARYING DATA TRAFFIC CONDITIONS

CROSS-REFERENCE TO RELATED APPLICATION

The present application is a continuation of U.S. patent application Ser. No. 11/314,169, filed on Dec. 21, 2005, (which will issue on Oct. 13, 2008 as U.S. Pat. No. 7,603, 511), entitled CYCLIC BUFFER MECHANISM FOR RECEIVING WIRELESS DATA UNDER VARYING DATA TRAFFIC CONDITIONS, which is a non-provisional of U.S. Provisional Patent Application Ser. No. 60/639,351 filed Dec. 27, 2004, the disclosures of which are incorporated by reference herein.

FIELD

The disclosed and claimed concept relates to the field of telecommunications and, more particularly, to a method of storing data on a handheld device.

BACKGROUND

Handheld wireless communications devices may not be able to adequate handle bursts of data for a particular application, such as e-mail. For example, when the Advanced Programming Interface (API) injects messages in a mail provider memory (e.g., the Outlook message store), the mail provider memory may not be able to transfer received mail messages fast enough to accommodate the mail receive rate. Devices receiving wireless push e-mail generally must implement low-memory handling when, after regular use, the amount of stored e-mail reaches the maximum allotted storage space on the device—and they should do so in such a way as to give preference to newly arriving e-mail. A cyclic First In First Out (FIFO) buffer as an e-mail message store is a simple example. With a wireless push delivery model, devices need to respond quickly to incoming e-mails, committing them to flash before acknowledging receipt back to infrastructure. Low memory handling must accommodate quick response under common e-mail traffic patterns—specifically, single "periodically" delivered e-mails, and potentially lengthy continuous streams of e-mails, queued up while the wireless device is out of coverage or in a radio-off mode, and delivered once the device reacquires the data channel. In a robust system, where flash is used to store e-mail, real time writes and deletes to flash can take significant amounts of time, but must still provide for quick real-time response.

Thus, it would be desirable to have a method of data transfer that makes wireless data transfer to non-volatile memory of a handheld wireless communications device more likely to occur.

BRIEF DESCRIPTION OF THE DRAWINGS

Embodiments of the disclosed and claimed concept will now be described by way of example with reference to attached figures, wherein:

DETAILED DESCRIPTION

In a wireless handheld communications device, a method ensures that data sent to a handheld wireless communications device (e.g., an e-mail message) is written to non-volatile memory. In a device, where data is initially written to a first volatile memory and then written to a second volatile memory before being written from the second volatile memory to a non-volatile memory, software code is implemented that causes the writing of the data to non-volatile memory concurrently with the writing of the data to the second volatile memory. The software code may incorporate operating system commands (such as Windows OS).

Figure 1:
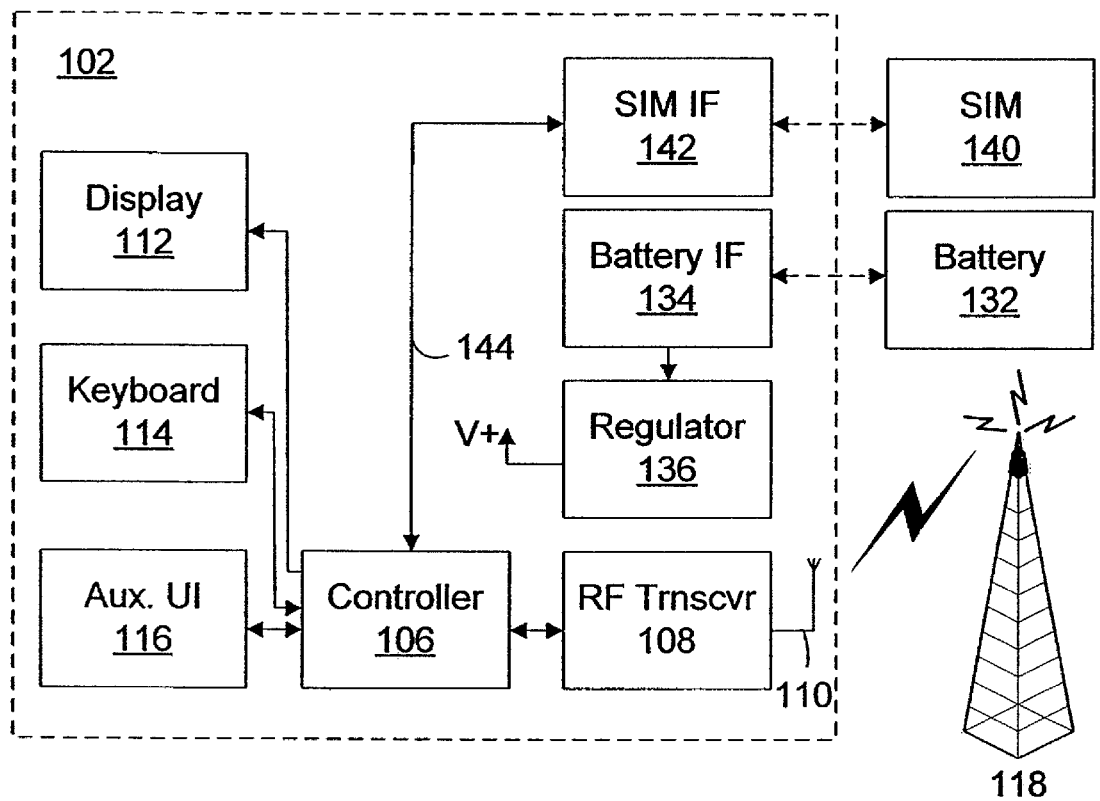
FIG. 1 is a block diagram that illustrates pertinent components of a wireless communications device that communicates within a wireless communication network.

FIG. 1 is a block diagram of a communication system that includes a mobile station 102 that communicates through a wireless communication network. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110. Preferably, the communication system is a push technology communication system in which messages are automatically sent (i.e., pushed) from a message service to the mobile station 102.

Typically, controller 106 is embodied as a central processing unit (CPU) which runs operating system software in a memory component. Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network, a telephone number to place a telephone call, commands to be executed on mobile station 102, and possibly other or different user inputs.

Mobile station 102 sends communication signals to and receives communication signals from the wireless network over a wireless link via antenna 110. RF transceiver circuitry 108 performs functions similar to those of a base station and a base station controller (BSC), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 134 provides for a mechanical and electrical connection for battery 132. Battery IF 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may, for example, consist of a single unit, such as a data communication device, a multiple-function communication device with data and voice communication capabilities, a personal digital assistant (PDA) enabled for wireless communication, or a computer incorporating an internal modem. Alternatively, mobile station 102 may, for example, be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
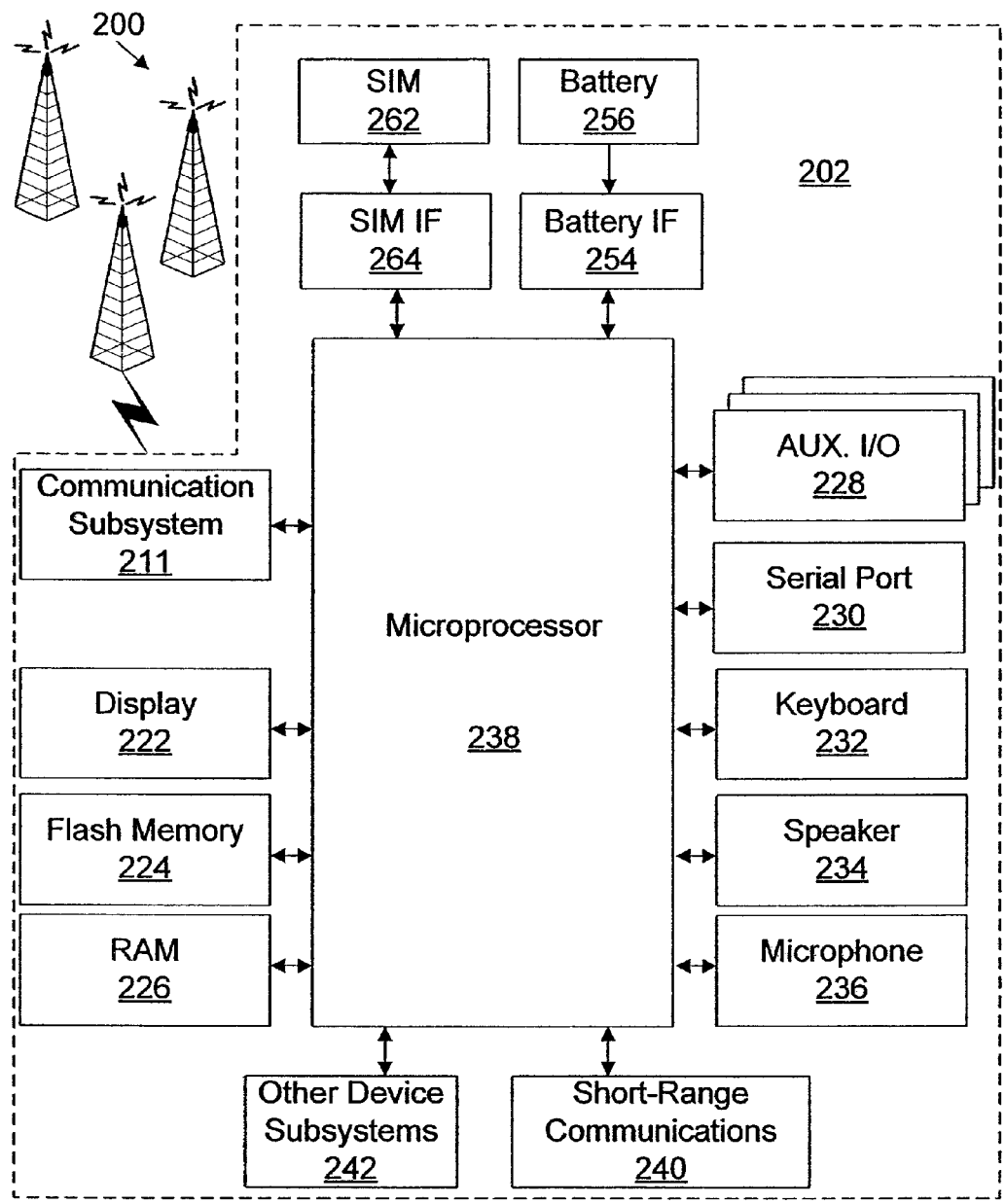
FIG. 2 is a detailed diagram of the wireless communications device of FIG. 1.

FIG. 2 is a detailed block diagram of mobile station 202. Mobile station 202 is preferably a two-way communication device having at least voice and advanced data communication capabilities, including the capability to communicate with other computer systems. Depending on the functionality provided by mobile station 202, it may be referred to as, for example, a data messaging device, a two-way pager, a cellular telephone with data messaging capabilities, a wireless Internet appliance, or a data communication device with or without telephony capabilities. Mobile station 202 may communicate with any one or more of a plurality of fixed transceiver stations 200 within its geographic coverage area.

Mobile station 202 will normally incorporate a communication subsystem 211, which may include a receiver, a transmitter, associated components such as one or more embedded or internal antenna elements, local oscillators (LOs), and a processing module such as a digital signal processor (DSP). Communication subsystem 211 is analogous to, for instance, RF transceiver circuitry 108 and antenna 110 shown in FIG. 1. As will be apparent to those skilled in field of communications, particular design of communication subsystem 211 may depend upon the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM card 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 may perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or other such storage element. Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A particular application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In at least one embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system.

Additional applications may also be loaded onto mobile station 202 through any one or more of the plurality of fixed transceiver stations 200, an auxiliary PO subsystem 228, serial port 230, short-range communications subsystem 240, or any other suitable subsystem 242, and installed by a user in RAM 226 or a non-volatile store for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228, or both, as described further herein with reference, for example, to FIGS. 3-7. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. Such composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 may be implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, a Bluetooth communication module to provide for communication with similarly-enabled systems and devices, or other communication system.

In accordance with an embodiment of the disclosed and claimed concept, the exemplary mobile station 202 is a multi-tasking handheld wireless communications device configured for sending and receiving data items and for making and receiving voice calls. To provide a user-friendly environment to control the operation of mobile station 202, an operating system resident on station 202 provides a Graphic User Interface (GUI) having a main screen and a plurality of sub-screens navigable from the main screen, for instance.

Figure 3:
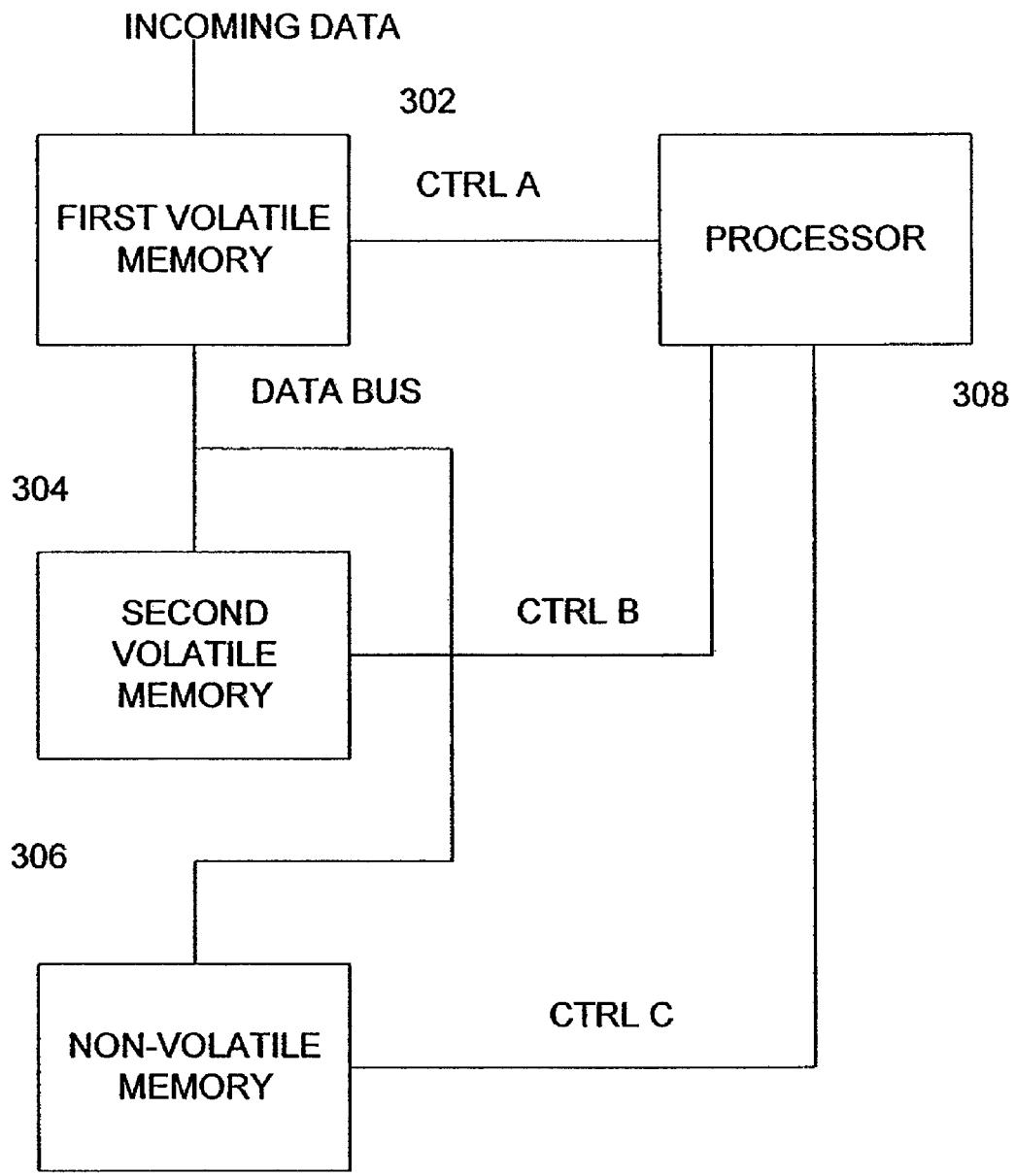
FIG. 3 illustrates an embodiment of a memory arrangement.

FIG. 3 illustrates an embodiment of a device memory arrangement in which a first volatile memory 302, such as random access memory—RAM, receives digitized data that has been wirelessly received by the handheld wireless communications device. Normally, this data is transferred to a second volatile memory 304 from which it is read from and written to non-volatile memory 306. With software code using write, delete, and flush commands, the improved method allows for received data, such as e-mail, to be written from the first volatile memory 302 to the non-volatile memory 306. In one embodiment, the second volatile memory 304 and the non-volatile memory 306 are written to during the same time interval. The writing to the second volatile memory 304 and the non-volatile memory 306 may be interleaved. The software code may be run on processor 308.

In a more specific description, several components can be employed in storing data to non-volatile memory 306. Where 'Device' is used, wireless device may be the exemplary case. Where 'application data' is used, e-mail may be the exemplary case. a) Device implements a maximum bounded buffer for storing application data in non-volatile storage. b) Device implements a "low watermark", significantly lower than the maximum bound, an example being 20%, at which size it attempts to maintain its application data buffer, when not under packet bombardment. c) Device implements a "bulk delete" mechanism, by which it can delete some large amount of application data efficiently. By way of example, this can be done by not flushing the deletes to non volatile storage until all deletes are complete, and in a manner that allows the underlying transport protocol (proprietary, or non-proprietary such as tcp) to acknowledge (ack) new incoming packets during execution of the deletion. Ideally the transport protocol is able to acknowledge incoming packets during the flush of the delete to flash. d) Device implements a "high watermark", greater than the low watermark and less than the maximum bound, below which a bulk delete is not triggered. Once the high watermark has been exceeded, unless the device is under "packet bombardment", the device will initiate a bulk delete, bringing the size of the buffer back down to low watermark. Note that the high watermark can be exceeded. e) Device algorithm defines "packet bombardment" as a state where the network is sending a stream of packets to the device typically due to push application data that was queued up while the device radio was off or the device was out of coverage. An example in a GPRS wireless network for 'packet bombardment determination' is the receipt of n contiguous packets each separated by t seconds, where n can be 2 packets, and t can be 5 seconds, for instance. Device will not perform a bulk delete under bombardment, except in case g) below. t) Device prevents bulk delete during packet bombardment by delaying the start of a bulk delete operation, after the high watermark has been exceeded, by some short duration, D, measured from the time of the last received packet. If a stream of packets is being received, the bulk delete is not performed until all outgoing queued packets are sent to the device, and the device has not received a packet for time D. g) If the application data buffer reaches the maximum bound while under bombardment, then a bulk delete of some fixed amount of application data is performed before committing to flash and acknowledging the particular data packet which took it over the limit. The bulk delete will not necessarily delete the quantity application data to bring the buffer down to the low watermark, but will allow for a significant amount of new application data to be received before hitting the maximum bound again. h) By way of example for a wireless e-mail device, some suggested values, based on estimated e-mail traffic, are: (maximum–low watermark=200), (high watermark–low watermark=50), (bulk delete at maximum >=50) i) A exemplary method of determining the parameters to be used in the above methods may be determined.

Figure 4:
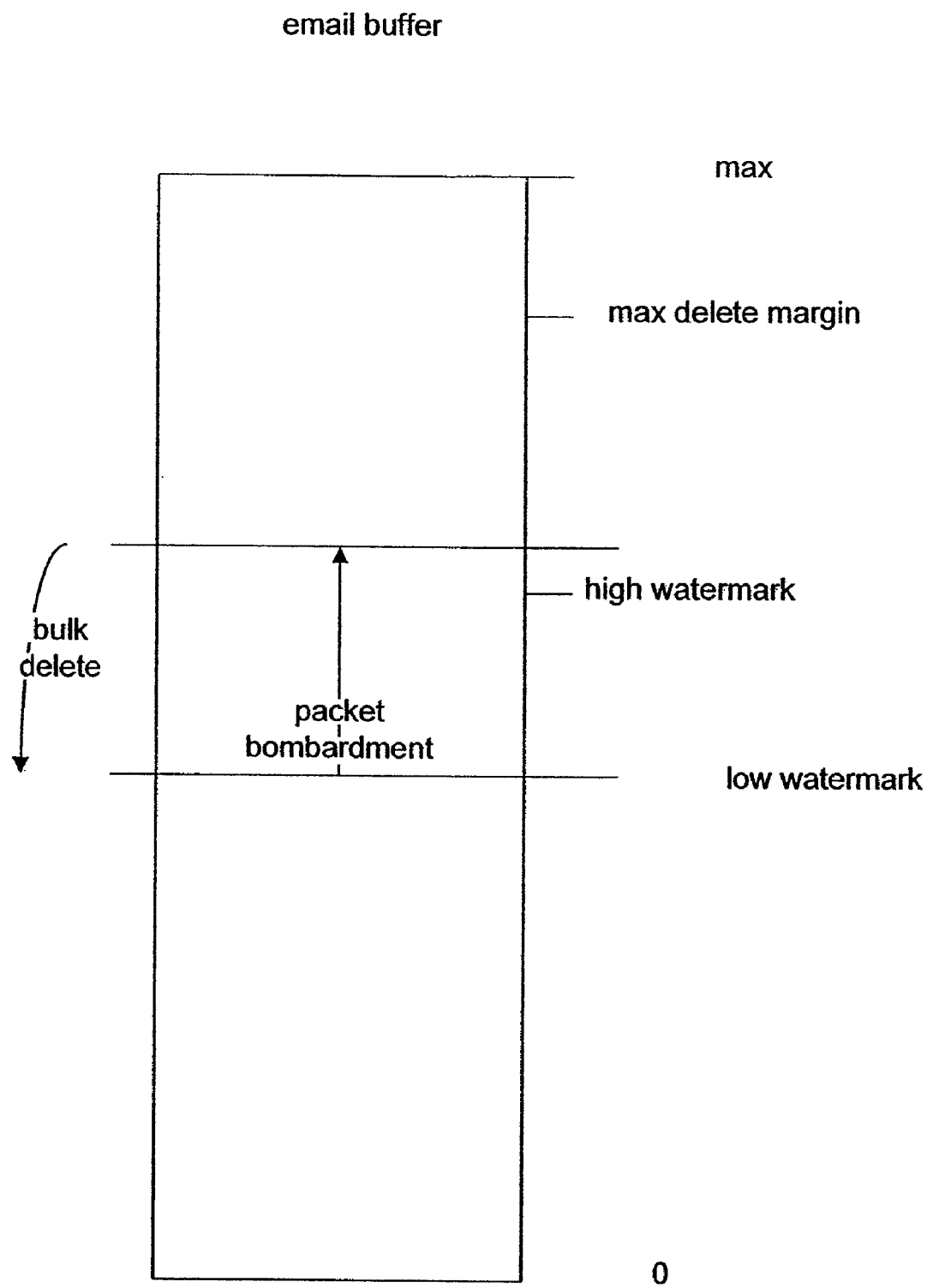
FIG. 4 illustrates a diagram of an embodiment of data memory management.

FIG. 4 illustrates an exemplary e-mail buffer (corresponding to the first volatile memory of FIG. 3). Where a datagram may have a maximum size or typical size, and where a datagram is comprised of individual packet(s): —a datagram is defined as the application data that is logically addressed into non-volatile storage for end user retrieval; and —a packet is defined as the MTU (maximum transmission unit) defined for the underlying transport protocol. Where there is a maximum datagram size, the following values may be defined: A=maximum application data buffer−low water mark=10*(maximum Datagram size); B=high watermark−low watermark=3*(maximum Datagram size); C=bulk delete at maximum; where $A \geq C \geq B$. so that bulk deletes at least bring the application data buffer to below the high water mark, but not below the low water mark; D=Maximum application data buffer=50*(maximum Datagram size).

Where there is a typical datagram size, the following values may be defined: A=maximum application data buffer−low water mark=200*(typical Datagram size); B=high watermark−low watermark=50*(typical Datagram size); C=bulk delete at maximum, where $A \geq C \geq B$, so that bulk deletes at least bring the application data buffer to below the high water mark, but not below the low water mark; D=Maximum application data buffer=1000*(typical Datagram size). All values may be scaled generically against the microprocessor capabilities and the read/write access times to the non-volatile storage. In an alternate embodiment, the e-mail buffer may be the second volatile memory.

Figure 5:
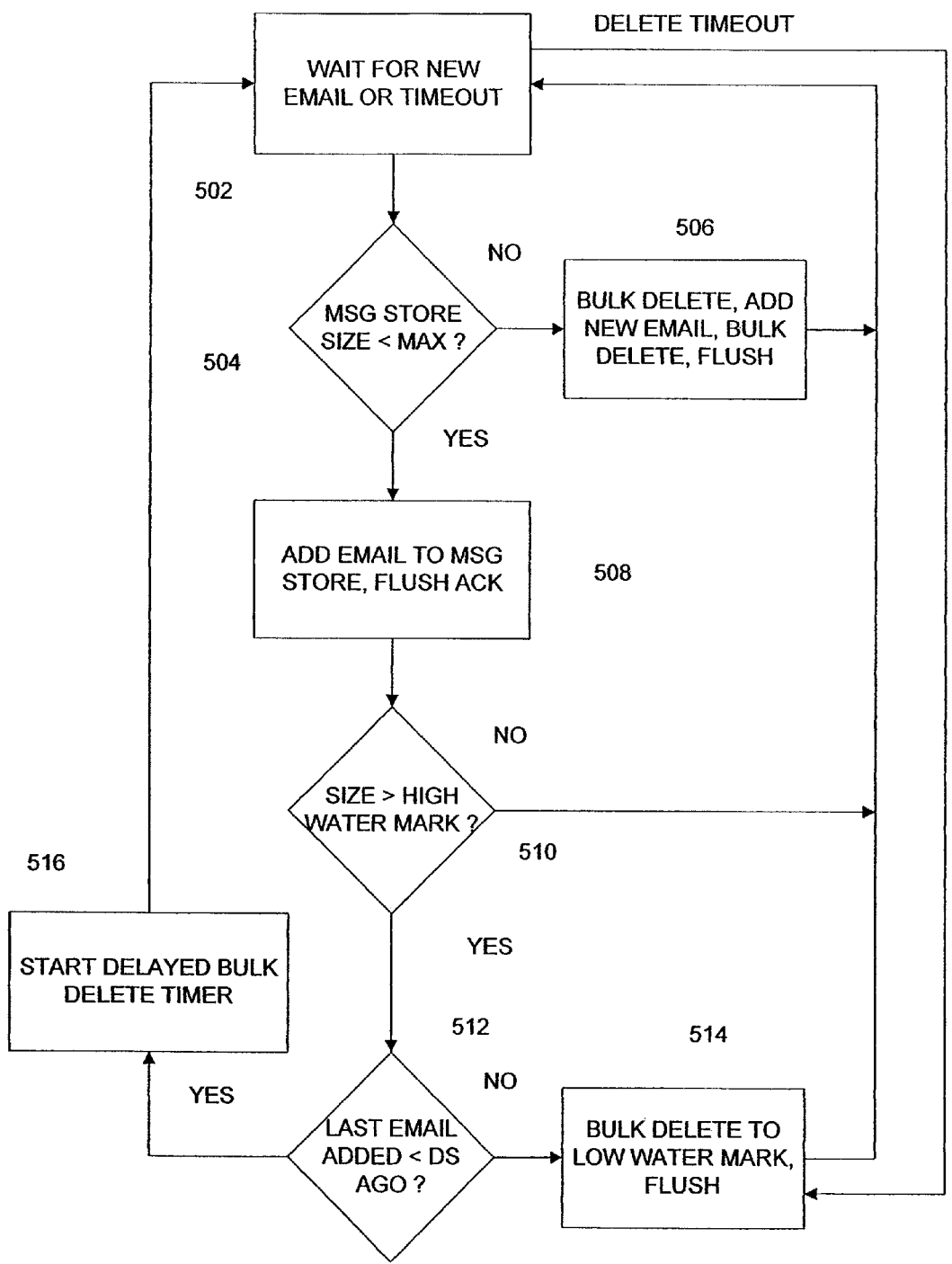
FIG. 5 illustrates an embodiment of a method of transferring data to non-volatile memory on a handheld wireless communications device.

FIG. 5 illustrates another embodiment of a method for writing an e-mail message to non-volatile memory (e.g., FLASH). When an e-mail message is received or a timeout occurs 502, a determination is made at 504 as to whether the e-mail message is smaller than a maximum size. If not, at 506 a bulk delete occurs, followed by addition of the new e-mail, another bulk delete, and a flush. Processing thereafter returns to step 502.

If at 504 the e-mail message is smaller than or equal to the maximum, at 508 the e-mail is added to the message store, followed by a flush and an acknowledgment. A determination is made at 510 as to whether the e-mail message size is greater than a high water mark. If not, processing returns to step 502. Otherwise, a determination is made at 512 as to whether the last e-mail message added occurred greater than a predetermined time interval. If not, at 514 a bulk delete occurs to the low water mark, followed by a flush; otherwise, at 516 a delayed bulk delete timer is started. Processing thereafter returns to 502.

The above-described embodiments of the present application are intended to be examples only. Those of skill in the art may effect alterations, modifications and variations to the particular embodiments without departing from the scope of the application. The disclosed and claimed concepts described herein and in the recited claims are intended to cover and embrace all suitable changes in technology.

What is claimed is:

1. A wireless handheld communications device, comprising:
   a first volatile memory having a first maximum bound buffer size;
   a second volatile memory having a second maximum bound buffer size;
   a non-volatile memory; and
   a processor adapted to control data transfer between the first volatile memory, the second volatile memory, and the non-volatile memory wherein, responsive to an incoming message size exceeding or being equal either the first volatile memory first maximum bound buffer size or the second volatile memory second maximum bound buffer size, the processor is structured to store an e-mail message in one of the first and second volatile memories.

2. The wireless handheld communications device of claim 1, wherein the non-volatile memory is FLASH memory.

3. The wireless handheld communications device of claim 1, wherein the processor is structured to perform a bulk delete when one of the first and second volatile memories exceeds or equals in size either the first volatile memory first maximum bound buffer size or the second volatile memory second maximum bound buffer size.

4. The wireless handheld communications device of claim 1, wherein:
   the processor is structured to employ at least one of the first and second volatile memories as an e-mail buffer; and
   the e-mail buffer has a high water mark, a low water mark, and a delete maximum level.

5. The wireless handheld communications device of claim 1, wherein:
   the processor is structured to make a determination whether the data is less than the delete maximum level; and
   as a part of the determination, the processor is structured to determine that the data is not less than the delete maximum level, perform a bulk delete, add the data, perform a bulk delete, and perform a flush.

6. The wireless handheld communications device of claim 1, wherein:
   the processor is structured to make a determination whether the data is less than the delete maximum level; and
   as a part of the determination, the processor is structured to determine that the data is less than the delete maximum level, add the data to a data store, perform a flush, and send an acknowledgment.

7. The wireless handheld communications device of claim 1, wherein the processor is structured to write the at least some of the data to both the second volatile memory and the non-volatile memory subsequent to the writing the data to the first volatile memory.

8. A wireless handheld communications device, comprising:
   a first volatile memory having a first maximum bound buffer size;
   a second volatile memory having a second maximum bound buffer size;
   a non-volatile memory; and
   a processor adapted to write at least some of the data to both a second volatile memory and a non-volatile memory, write the at least some of the data substantially concurrently to the second volatile memory and the non-volatile memory; and interleave the writing of the at least some of the data to the second volatile memory with the writing of the at least some of the data to the non-volatile memory.

9. The wireless handheld communications device of claim 8, wherein the non-volatile memory is FLASH memory.

10. The wireless handheld communications device of claim 8, wherein the processor is adapted to control data transfer between the first volatile memory, the second volatile memory, and the non-volatile memory wherein, responsive to an incoming message size exceeding or being equal either the first volatile memory first maximum bound buffer size or the second volatile memory second maximum bound buffer size, the processor is structured to store an e-mail message in one of the first and second volatile memories.

11. The wireless handheld communications device of claim 10, wherein the processor is structured to perform a bulk delete when one of the first and second volatile memories exceeds or equals in size either the first volatile memory first maximum bound buffer size or the second volatile memory second maximum bound buffer size.

12. The wireless handheld communications device of claim 10, wherein:
the processor is structured to employ at least one of the first and second volatile memories as an e-mail buffer; and
the e-mail buffer has a high water mark, a low water mark, and a delete maximum level.

13. The wireless handheld communications device of claim 10, wherein:
the processor is structured to make a determination whether the data is less than the delete maximum level; and
as a part of the determination, the processor is structured to determine that the data is not less than the delete maximum level, perform a bulk delete, add the data, perform a bulk delete, and perform a flush.

14. The wireless handheld communications device of claim 10, wherein:
the processor is structured to make a determination whether the data is less than the delete maximum level; and
as a part of the determination, the processor is structured to determine that the data is less than the delete maximum level, add the data to a data store, perform a flush, and send an acknowledgment.

15. The wireless handheld communications device of claim 10, wherein the processor is structured to write the at least some of the data to both the second volatile memory and the non-volatile memory subsequent to the writing the data to the first volatile memory.

16. A wireless handheld communications device, comprising:
a first volatile memory;
a second volatile memory;
a non-volatile memory; and
a processor adapted to write data to a first volatile memory and write at least some of the data to both a second volatile memory and a non-volatile memory, wherein the writing of the at least some of the data to both the second volatile memory and the non-volatile memory concurrently.

17. The device of claim 16, wherein the processor is adapted to control data transfer between the first volatile memory, the second volatile memory, and the non-volatile memory.

18. The device of claim 16, wherein the data comprises an email message, and responsive to an incoming message size exceeding or being equal to a predetermined maximum in one of the first and second volatile memories, the processor is structured to store the e-mail message in one of the first and second volatile memories, and wherein at least some of the data is written to both the second volatile memory and the non-volatile memory concurrently.

19. The wireless handheld communications device of claim 16, wherein the non-volatile memory is FLASH memory.

20. The wireless handheld communications device of claim 16, wherein the processor is structured to perform a bulk delete when one of the first and second volatile memories exceeds or equals a predetermined maximum in the one of the first and second volatile memories.

* * * * *

UNITED STATES PATENT AND TRADEMARK OFFICE
CERTIFICATE OF CORRECTION

PATENT NO.         : 8,024,510 B2
APPLICATION NO.    : 12/577392
DATED              : September 20, 2011
INVENTOR(S)        : Mike Rybak et al.

Page 1 of 1

It is certified that error appears in the above-identified patent and that said Letters Patent is hereby corrected as shown below:

Column 4, line 67 "PO" should read "I/O"
Column 6, line 49 "t)" should read "f)"
Column 7, line 16 "A>=C>=B." should read "A>=C>=B,"

Signed and Sealed this
Seventeenth Day of July, 2012

David J. Kappos
*Director of the United States Patent and Trademark Office*